(12) United States Patent  (10) Patent No.: US 7,401,517 B2
Pan et al.  (45) Date of Patent: Jul. 22, 2008

(54) DUAL-AXIS YAW RATE SENSING UNIT HAVING A TUNING FORK GYROSCOPE ARRANGEMENT

(75) Inventors: Zhiyu Pan, San Jose, CA (US); Christoph Lang, Los Altos, CA (US); Gary Yama, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/506,712

(22) Filed: Aug. 18, 2006

(65) Prior Publication Data

US 2008/0041155 A1 Feb. 21, 2008

(51) Int. Cl.
*G01P 9/04* (2006.01)
(52) U.S. Cl. .................. 73/504.16; 73/504.12
(58) Field of Classification Search .............. 73/514.16, 73/514.12, 504.15, 504.16, 504.12; 310/370
See application file for complete search history.

(56) References Cited

U.S. PATENT DOCUMENTS

| 3,354,413 | A  | * | 11/1967 | Ko ............................. 333/200 |
| 6,177,756 | B1 | * | 1/2001  | Yachi et al. .................. 310/370 |
| 6,462,530 | B1 | * | 10/2002 | Layton .................... 324/76.49 |
| 6,584,844 | B2 | * | 7/2003  | Beitia ...................... 73/504.16 |
| 7,216,540 | B2 | * | 5/2007  | Inoue et al. ............... 73/504.16 |
| 2007/0013464 | A1 | * | 1/2007 | Pan et al. .................... 333/200 |

* cited by examiner

*Primary Examiner*—Helen C. Kwok
(74) *Attorney, Agent, or Firm*—Kenyon & Kenyon LLP (57) ABSTRACT

A dual-axis tuning fork gyroscope includes four open-ended tuning forks arranged coplanarly in two opposite pairs, a first pair of open-ended tuning forks being arranged opposite one another along a first axis, a second pair of open-ended tuning forks being arranged opposite one another along a second axis, the first axis and the second axis being perpendicular to one another. The four open-ended tuning forks are mechanically coupled together so that all four tuning forks vibrate in the same manner in terms of frequency and phase.

17 Claims, 10 Drawing Sheets

DUAL-AXIS YAW RATE SENSING UNIT HAVING A TUNING FORK GYROSCOPE ARRANGEMENT

FIELD OF THE INVENTION

The present invention relates to a dual-axis yaw rate sensing unit having a single mechanical resonant structure.

BACKGROUND INFORMATION

Figure 1:
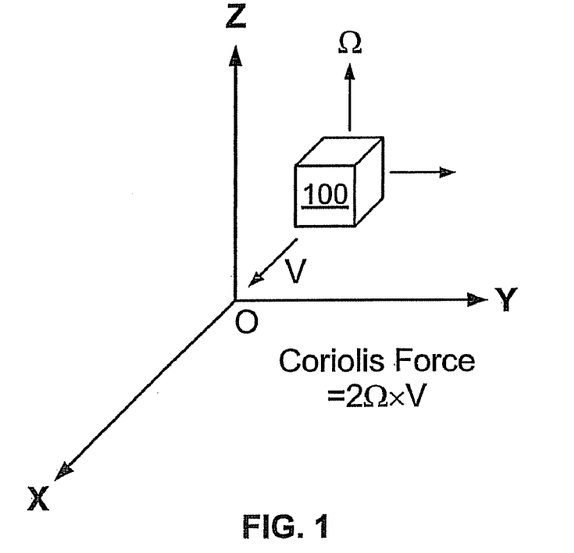
FIG. 1 shows the working principles of a vibrating yaw rate sensor with respect to a moving object and the Coriolis Effect.

FIG. 1 shows the working principles of a vibrating yaw rate sensor with respect to a moving object 100 and the Coriolis Force, which is represented by the following formula:

$$F = 2\Omega \times V$$

Here, $\Omega$ is the angular velocity vector of the rotating coordinate system XYZ, and V is the velocity vector of the moving object 100 within the rotating coordinate system XYZ. In this regard, as shown in FIG. 1, the moving object 100 will appear to an observer, who is fixed with respect to the rotating coordinate system XYZ to accelerate in a direction that is perpendicular to the velocity vector V and the angular velocity vector $\Omega$.

In a MicroElectrical Mechanical System (MEMS) gyroscope which operates according to the above principles, the Coriolis force may change the stress on micromechanical beam contained therein. The change in stress may be measured, for example, using principles of piezoelectronics or piezioresistance.

MEMS gyroscopes may be used in high-volume applications, including such applications as automotive and consumer electronics. For example, MEMS gyroscopes may be used in electronic stability programs, rollover sensors, navigation systems, computer gaming input devices, camcorder stabilization, electronic toys, etc. In this regard, the use of integrated circuit (IC) fabrication technologies and MEMS batch processes may provide low-cost, super compact and highly integrated gyroscopes that are more cost-effective and convenient than traditional mechanical or optical gyroscopes in large-scale and cost-sensitive applications.

MEMS gyroscopes may operate in the manner of a vibrating gyroscope. For example, Putty and Najafi, "Tech. Dig. Solid-State Sensor and Actuator Workshop", Hilton Head Island, S.C., June 1994, pages 213 to 220, refer to a vibrating ring gyroscope; Bernstein et al., "MEMS '93", Fort Lauderdale, Fla., February 1993, pages 143 to 148, refer to tuning fork gyroscope; and Juneau et al., "Tech. Dig. $9^{th}$ International Conference on Solid State Sensors and Actuators (Transducers '97)", Chicago, Ill., June 1997, pages 883 to 886, refer to a torsion-vibrating gyroscope. To reduce the size of torsion-vibrating MEMS gyroscopes, it would be desirable to use a minimum number of resonant structures to sense the yaw rate in more than one direction. However, because it has been difficult to couple vibration mode in two orthogonal directions, there are no MEMS gyroscopes which use a single tuning fork resonator structure to sense more than one axis yaw rate, except the torsion-vibrating disc-based gyroscope referred to in the Juneau et al reference.

To sense the yaw rate in more than one axial direction, two individual vibrating gyroscopes may be placed on the same chip, each gyroscope being arranged to sense the yaw rate in one of two orthogonal directions. In this instance, because of the inherent variation in the manufacture process, even two identically manufactured vibrating gyroscopes will not have exactly the same resonance frequency. Therefore, such a system requires two separate detecting and control circuitry.

Figure 8:
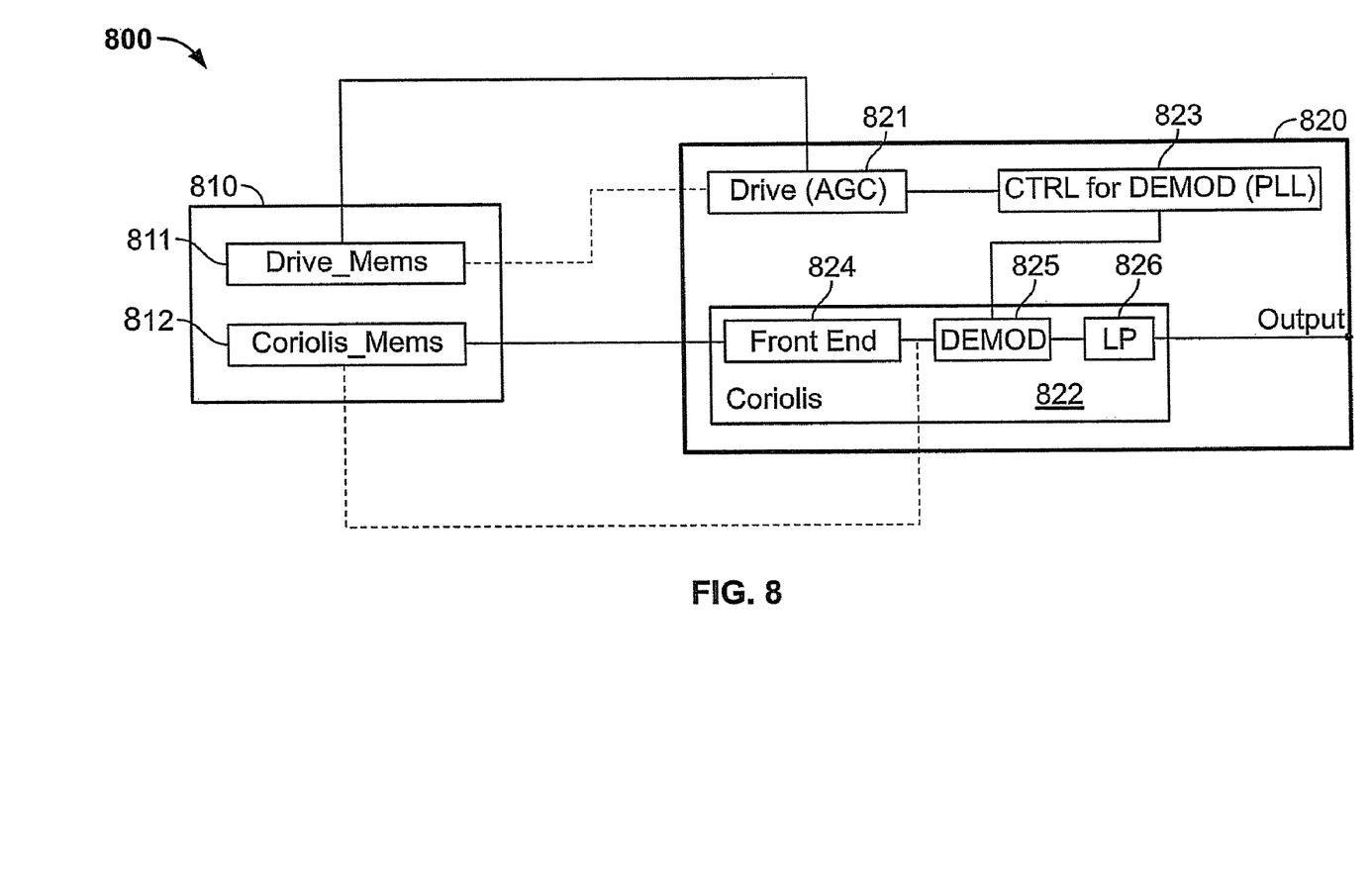
FIG. 8 shows a conventional one-axis system.

FIG. 8 shows a one axis system 800, which includes MEMS portion 810 and an evaluation electronics 820. The MEMS portion 810 includes a drive MEMS 811 and a coriolis MEMS 812. The evaluation electronics 820 includes drive electronics 821, coriolis detection electronics 822, and a demodulation control circuit 823.

The drive electronics 821 drives the MEMS portion 810 to resonate at its resonance frequency with a defined amplitude in order to make use of the Coriolis effect, which is proportional to the velocity of the moving mass and results in a force that will be measured by the coriolis detection electronics 822. In this instance, the drive electronics 821 is provided with automatic gain control (AGC). As indicated by the dashed line connecting the drive MEMS 811 and the drive electronics 821, the circuitry may be optionally operated in closed loop.

The coriolis detection electronics 822 measures the force that is generated because of the Coriolis effect. Since the drive MEMS 811 is oscillating at the drive resonance frequency, the coriolis signal is an AC signal at exactly the drive resonance frequency. If the coriolis resonance frequency is exactly the same as the drive resonance frequency and the quality factor Q of the coriolis MEMS is high, the coriolis signal should have a high signal-to-noise ratio. The coriolis detection electronics 822 includes a front end 824, a demodulator 825 and an LP 826. The coriolis detection electronics 822 may optionally be operated in closed loop, as indicated by the dashed line connecting the coriolis detection electronics 822 to the coriolis MEMS 812.

The demodulation control circuit 823 provides a control signal to demodulate the output of the coriolis front end 824 with a signal at the drive resonant frequency and the proper phase information to filter out the corolis signal in the coriolis loop. In this instance, a phase lock loop (PLL) may be used to generate the control signals for the demodulation. However, such a phase lock loop may consume a considerable amount of chip area and power. Although use of the phase lock loop (PLL) is not mandatory, the phase lock loop (PPL) may replace the extra clock unit.

Figure 9:
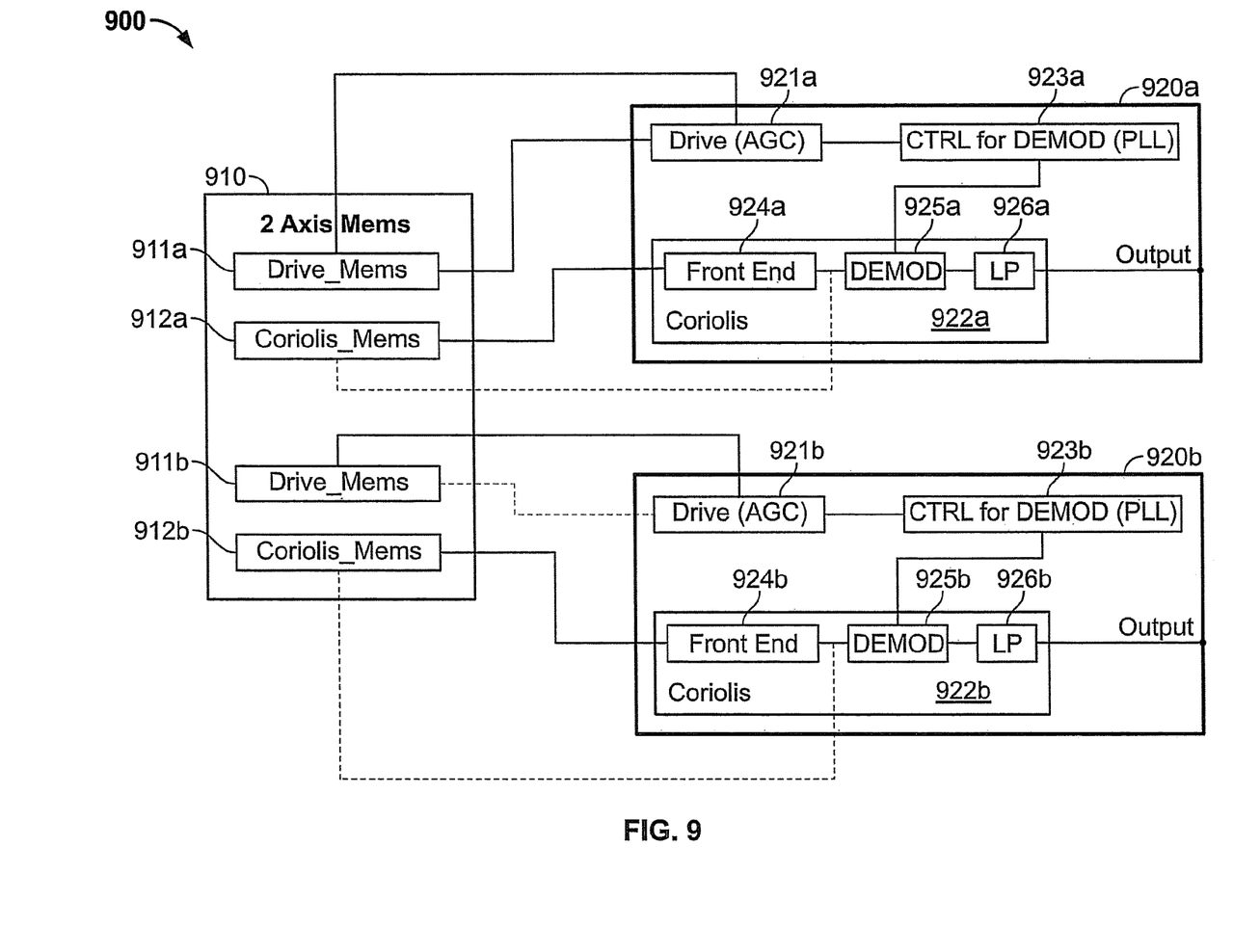
FIG. 9 shows a conventional two-axis system, which duplicates the electronics of the one-axis system of FIG. 8.

FIG. 9 shows a two-axis system 900, which duplicates the electronics of the one-axis system 800 of FIG. 8. With such duplication, the two-axis system 900 requires two separate drive resonance frequencies, which are not guaranteed to be equal.

Figure 10:
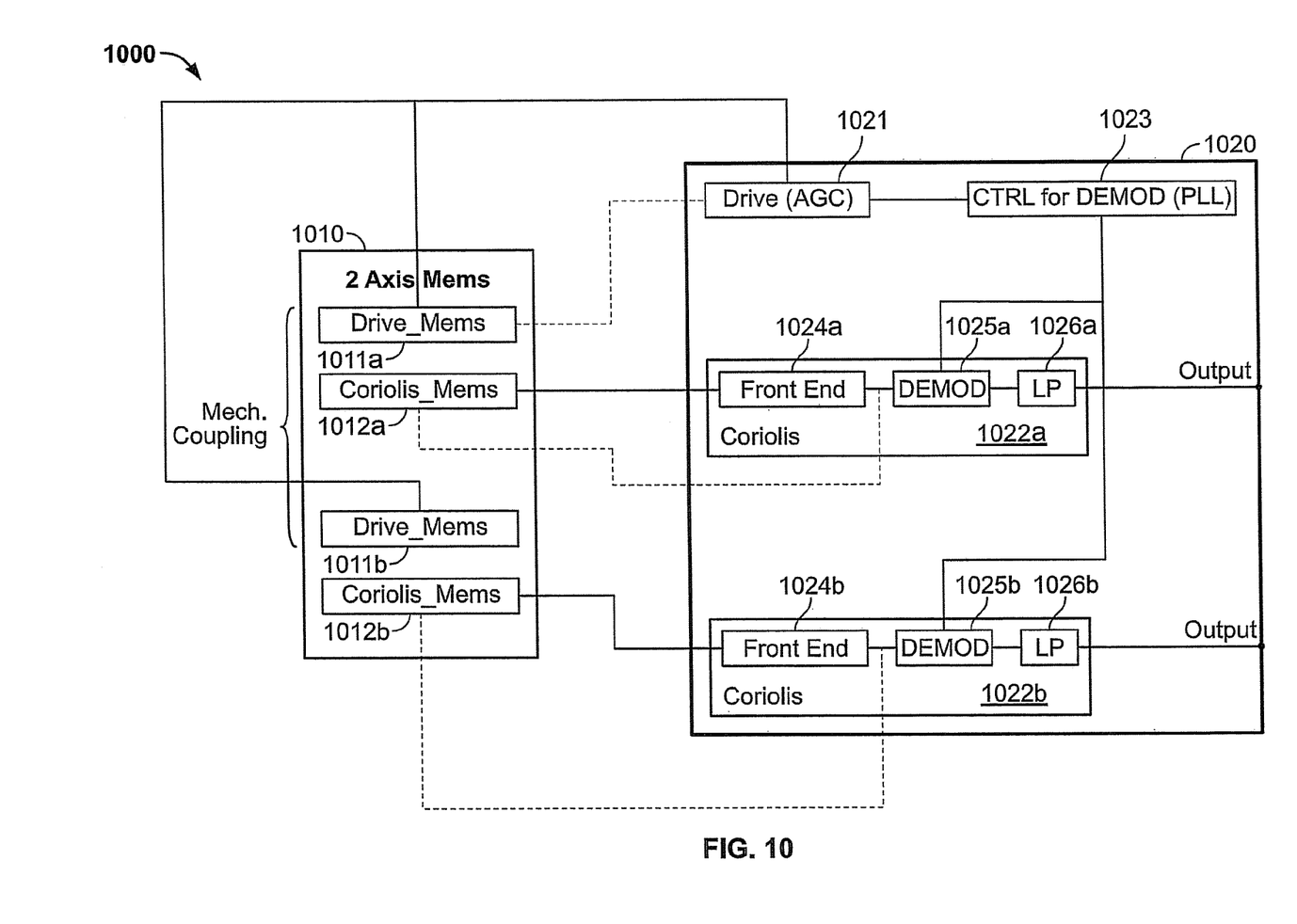
FIG. 10 shows an exemplary dual-axis yaw rate system that has only one drive electronics and only one control circuitry for demodulation.

FIG. 10 shows an exemplary dual-axis yaw rate system that has only one drive electronics and only one control circuitry demodulation.

Figure 11:
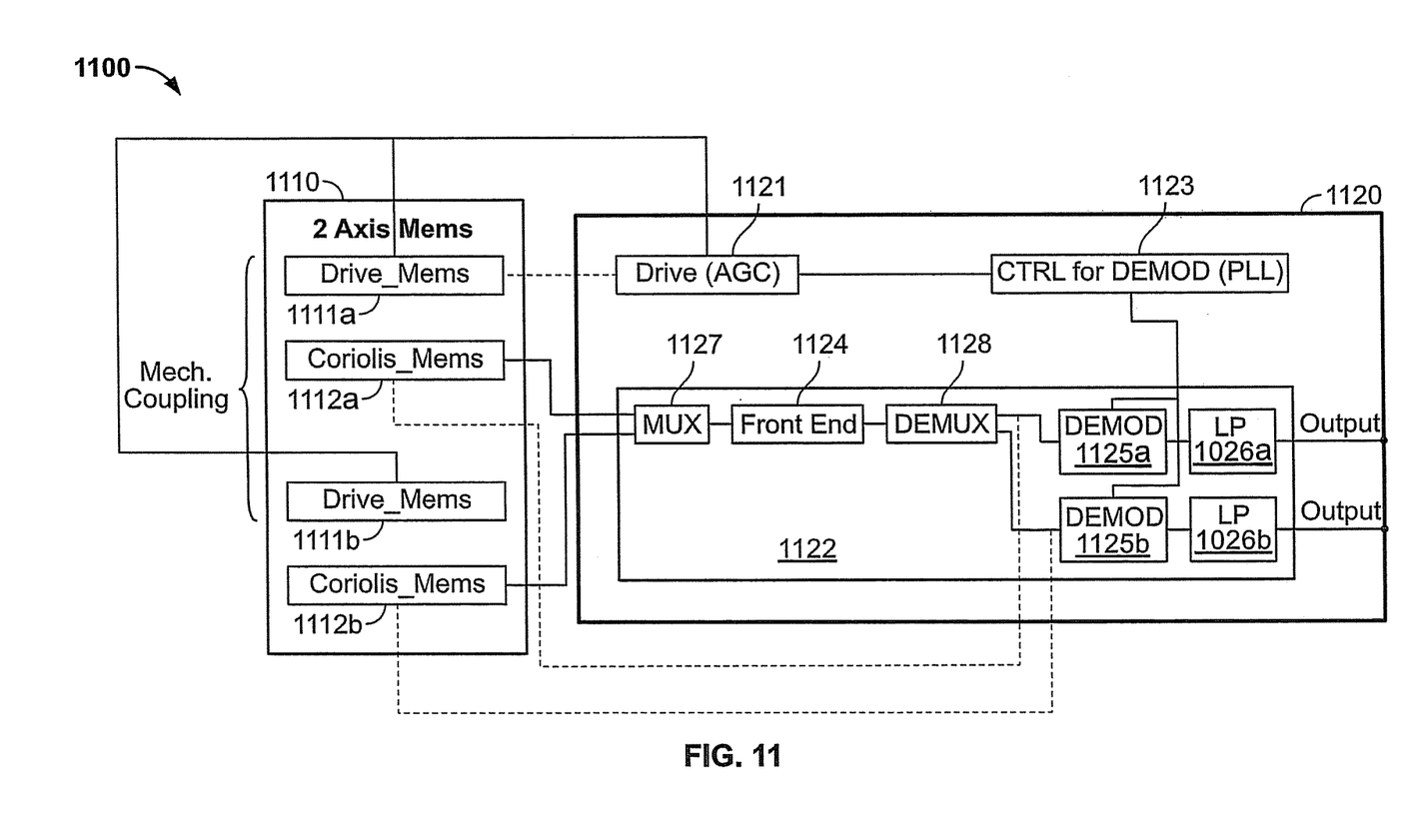
FIG. 11 shows an exemplary dual-axis yaw rate system which uses only one front end followed by a nultiplexer for the coriolis loop.

FIG. 11 shows an exemplary dual-axis yaw rate system which uses only one front end followed by a multiplexer for the coriolis loop.

SUMMARY OF THE INVENTION

An exemplary embodiment of the present invention provides an exemplary dual-axis yaw rate sensing unit, which is based on a single mechanical resonant structure. That is, unlike other prior vibrating gyroscopes, which require at least two resonant structures to sense a yaw rate in two axial directions simultaneously, the exemplary dual-axis yaw rate sensing unit of the present invention may sense the yaw rate in two axial directions simultaneously using only a single resonant structure.

The exemplary dual-axis yaw rate sensing unit of the present invention may be manufactured using only one mask. In other words, one mask is enough to define an anchor, the individual tuning forks, as well as its coupling parts. The exemplary dual-axis yaw rate sensing unit may include a driving arrangement with capacitive and/or piezoelectric elements, and a sensing arrangement having capacitive, piezoelectric and/or piezo-resistive elements.

An exemplary embodiment of the present invention is directed to a dual-axis yaw rate sensor, which includes four open-ended tuning forks arranged coplanarly in two opposite pairs, a first pair of open-ended tuning forks being arranged opposite one another along a first axis, a second pair of open-ended tuning forks being arranged opposite one another along a second axis, the first axis and the second axis being perpendicular to one another, in which the four open-ended tuning forks are mechanically coupled together so that all four tuning forks vibrate in the same manner in terms of frequency and phase.

Another exemplary embodiment of the present invention is directed to a dual-axis yaw rate sensor, which further includes an anchor to anchor the tunings forks and to serve as a common point at which the tuning forks are mechanically coupled together.

Yet another exemplary embodiment of the present invention is directed to a dual-axis yaw rate sensor, which further includes at least one pair of driving electrodes arranged to vibrate at least one of the tuning forks.

Still another exemplary embodiment of the present invention is directed to a dual-axis yaw rate sensor, which further includes a drive unit to drive the at least one pair of driving electrodes at a common frequency.

Yet another exemplary embodiment of the present invention is directed to a dual-axis yaw rate sensor, in which the at least one pair of driving electrodes operate to produce an electrical static force.

Still another exemplary embodiment of the present invention is directed to a dual-axis yaw rate sensor, in which the at least one pair of driving electrodes operate to produce a piezoelectric force.

Yet another exemplary embodiment of the present invention is directed to a dual-axis yaw rate sensor, which further includes at least one pair of sensing electrodes operate to sense a vibration of at least one of the tuning forks.

Still another exemplary embodiment of the present invention is directed to a dual-axis yaw rate sensor, which includes a common sensing unit to process detection signals from the at least one pair of sensing electrodes at the common frequency, the detection signals representing a yaw rate in two axial directions.

Yet another exemplary embodiment of the present invention is directed to a dual-axis yaw rate sensor, in which the at least one pair of sensing electrodes operate as capacitive electrodes.

Still another exemplary embodiment of the present invention is directed to a dual-axis yaw rate sensor, in which the at least one pair of sensing electrodes operate as piezoelectric electrodes.

Yet another exemplary embodiment of the present invention is directed to a dual-axis yaw rate sensor, in which the at least one pair of sensing electrodes operate as piezoresistive electrodes.

Still another exemplary embodiment of the present invention is directed to a yaw rate sensor, which includes a single resonant structure for sensing simultaneously the yaw rate in two axial directions, the single resonant structure including four open-ended tuning forks mechanically coupled together at a common point so that all four tuning forks vibrate in the same manner in terms of frequency and phase.

Yet another exemplary embodiment of the present invention is directed to a yaw rate sensor, which further includes a single drive unit to vibrate the tuning forks at a common frequency.

Still another exemplary embodiment of the present invention is directed to a yaw rate sensor, which further includes a single sensing unit to sense the vibration of the tuning forks simultaneously in the two axial directions at the common frequency.

Yet another exemplary embodiment of the present invention is directed to a yaw rate sensor, which further includes two sensing units to sense the vibration of the tuning forks, each of the two sensing units sensing the yaw rate in one of the two axial directions.

Still another exemplary embodiment of the present invention is directed to a yaw rate sensor, which includes a plurality of open-ended tuning forks mechanically coupled together so that all tuning forks vibrate in the same manner in terms of frequency and phase.

Yet another exemplary embodiment of the present invention is directed to a yaw rate sensor, which further includes a single drive unit to vibrate the plurality of tuning forks at a common frequency.

Still another exemplary embodiment of the present invention is directed to a yaw rate sensor, which further includes a single sensing unit to sense the vibration of the tuning forks simultaneously in more than one axial direction at the common frequency.

Yet another exemplary embodiment of the present invention is directed to a yaw rate sensor, in which the plurality of open-ended tuning forks are arranged coplanarly in two opposite pairs, a first pair of open-ended tuning forks being arranged opposite one another along a first axis, a second pair of open-ended tuning forks being arranged opposite one another along a second axis, the first axis and the second axis being perpendicular to one another.

Still another exemplary embodiment of the present invention is directed to a yaw rate sensor, which includes a MEMS arrangement including a first coriolis component, a second coriolis component, a first drive component to drive the first coriolis component, and a second drive component to drive the second coriolis component, the first drive component and the second drive component mechanically coupled together so that each will vibrate in the same manner in terms of frequency and phase, and a common driving arrangement to drive the first and second drive components.

Yet another exemplary embodiment of the present invention is directed to a yaw rate sensor, which further includes a common evaluation arrangement coupled to the first and second coriolis arrangements.

DETAILED DESCRIPTION

According to exemplary embodiment of the present invention, an exemplary dual-axis yaw rate sensing unit of the present invention includes four individual open-ended tuning forks, which may be arranged along the +X, −X, +Y and −Y directions, respectively. The four open-ended tuning forks are mechanically coupled together such that all four tuning forks will vibrate in the same manner in terms of frequency and phase irrespective of their manufacture process variations. In this regard, the point at which the tuning forks are mechanically coupled together may also serve to anchor the tuning forks.

Because of the symmetrical and balanced topology of the four individual open-ended tuning forks, both driving and sensing configurations of the exemplary dual-axis yaw rate sensing unit may be simplified with respect to other prior vibrating gyroscopes since any individual fork vibration will lead to the other forks vibrating with the exact same frequency and generating the basic motion of the gyro unit. For example, if the tuning fork arranged along the −X axial direction is driven (i.e., vibrated), the other three tuning forks arranged along the +X, +Y and −Y axial directions will vibrate with the same frequency. Alternatively, to achieve a well-defined phase, two tuning forks may used as driving tuning forks. For example, if the tuning fork arranged along the −X direction and the tuning fork arranged along the +Y axial direction are both driven, the other two tuning forks arranged along the +X and −Y axial directions will also vibrate due to the mechanic coupling in the center. Thus, when the tuning forks arranged along the −X and +Y axial directions are driven, the other two tuning forks arranged along the +X and −Y directions serve as sensing tuning forks. As for signal detection, since the elements for sensing the two-directional yaw rate vibrate in exactly the same frequency, the detection signals may be processed using a single sensing unit.

Figure 2:
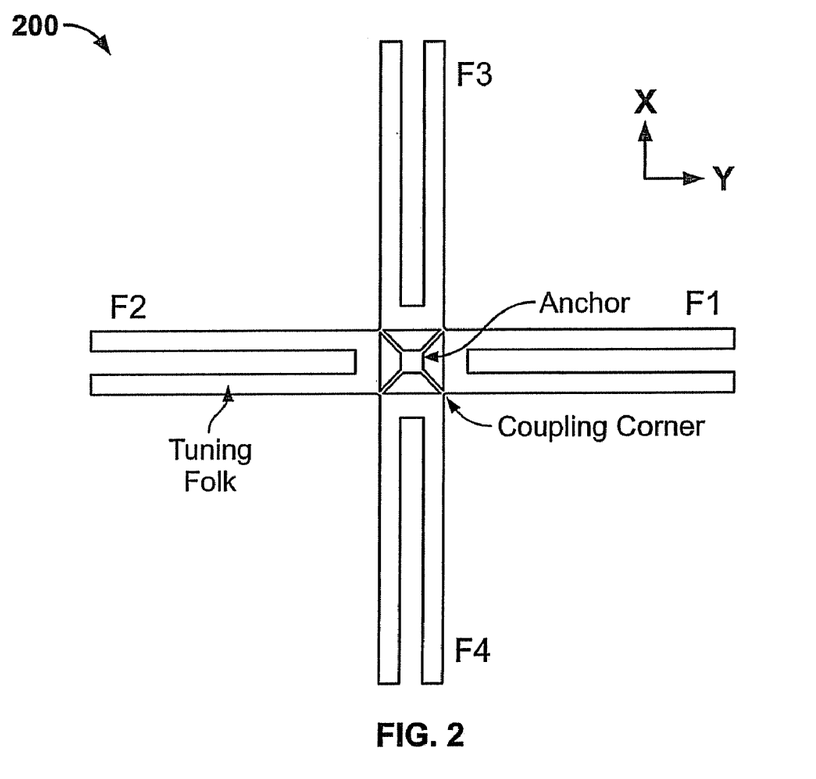
FIG. 2 shows a top view of an exemplary yaw rate sensing unit for sensing the yaw rate in two axial directions simultaneously using only a single resonant structure.

FIG. 2 shows a top view of an exemplary yaw rate sensing unit 200 for sensing the yaw rate in two axial directions simultaneously using only a single resonant structure. The exemplary yaw rate sensing unit 200 includes four individual tuning forks F1 to F4 arranged along the +X, −X, +Y and −Y axial directions respectively. That is, individual tuning fork F1 is arranged along the +X axial direction, individual tuning fork F2 is arranged along the −X axial direction, individual tuning fork F3 is arranged along the +Y axial direction, and individual tuning fork F4 is arranged along the −Y axial direction.

The four individual tuning forks F1 to F4 are mechanically coupled together in a center location via an anchor, which may secure the four individual tuning forks F1 to F4 to an underlying substrate. Accordingly, the four individual tuning forks F1 to F4 will vibrate strictly in the same frequency (at least as a practical manner). Hence, if any one of the four individual tuning forks vibrate, the other three tuning forks will also vibrate in the same frequency.

According to an exemplary embodiment of the present invention, the two individual tuning forks F1 and F2 arranged along the +X and −X axial directions respectively may be used to sense the yaw rate along the X axis, and the two individual tuning forks F3 and F4 arranged along the +Y and −Y axial directions may be used to sense the yaw rate along the Y axis. According to another exemplary embodiment of the present invention, each of the four individual tuning forks operate as an individual gyroscope with individual drive and sensing electrodes. The driving electrode may operate, for example, according to capacitive and/or piezoelectric principles. The sensing electrode may operate, for example, according to capacitive, piezoelectric and/or piezoresistive principles.

Figure 3:
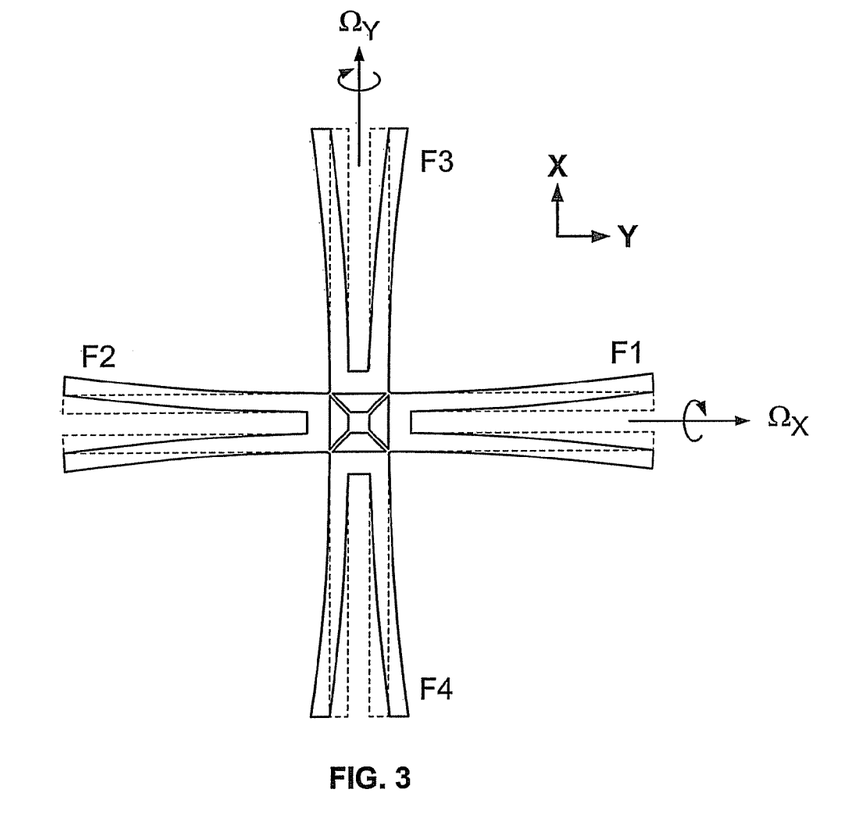
FIG. 3 shows an exemplary working mode operation of the exemplary yaw rate sensing unit of FIG. 2.

FIG. 3 shows an exemplary working mode operation of the exemplary yaw rate sensing unit of FIG. 2, in which the tuning forks F1 to F4 vibrate to sense the angular velocity along the X and Y axis's. In particular, the tuning forks F1 and F2 vibrate to sense an angular velocity vector $\Omega_x$ along the X axis, and the tuning forks F3 and F4 vibrate to sense an angular velocity vector $\Omega_y$ along the Y axis.

Figure 4A:
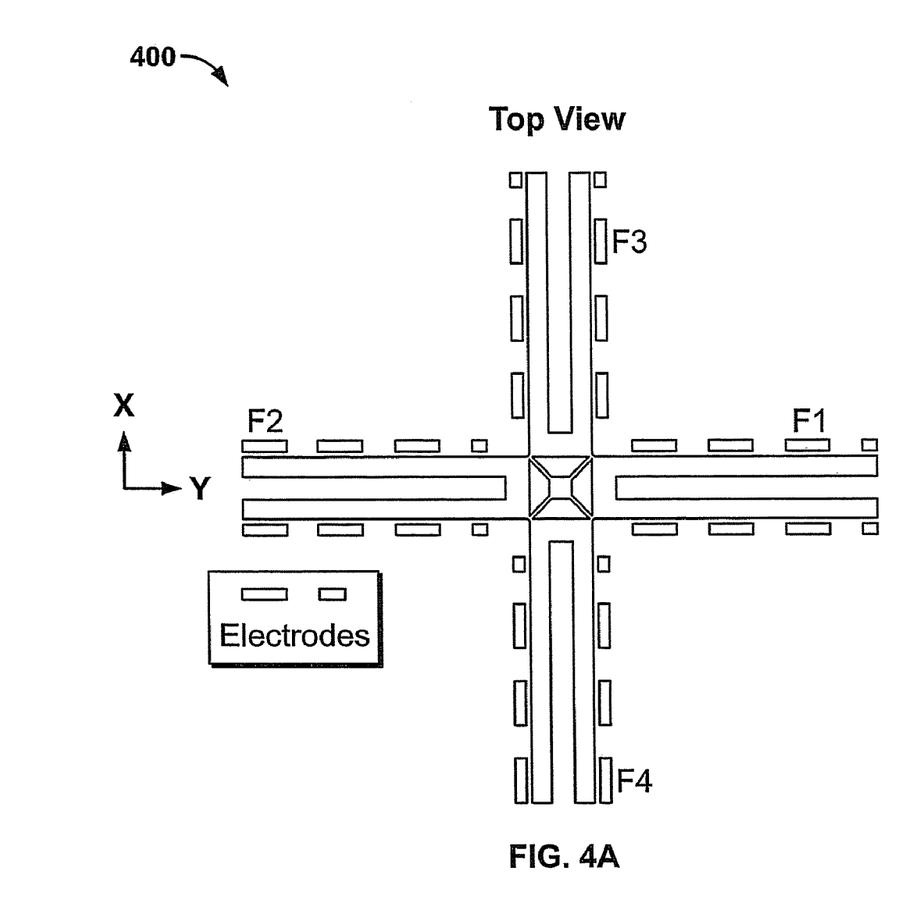
FIG. 4A is a top view of an exemplary yaw rate sensing unit, which operates according to a capacitive principle.
Figure 4B:
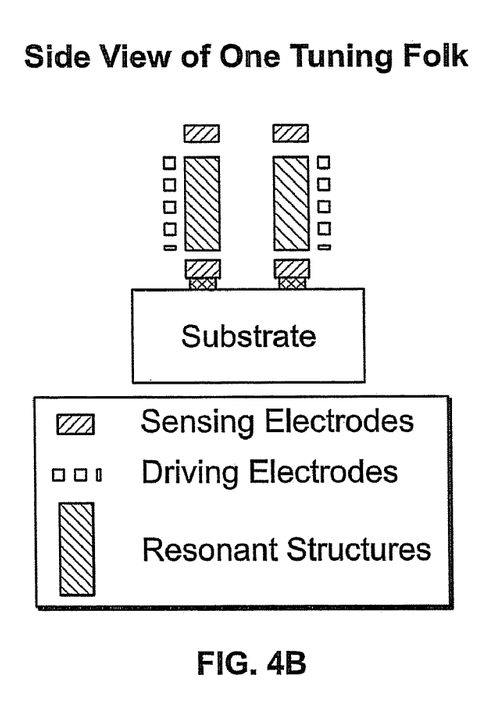
FIG. 4B is a side view of the exemplary yaw rate sensing unit of FIG. 4A.

FIGS. 4A and 4B are a top view and side view, respectively, of an exemplary yaw rate sensing unit 400, which operates according to a capacitive principle. The exemplary yaw rate sensing unit 400 includes four individual tuning forks F1 to F4, driving electrodes, sensing electrodes and a substrate. The four individual tuning forks F1 to F4 are arranged along the +X, −X, +Y and −Y axial directions, respectively, and are mechanically coupled together in a center location via an anchor, which secures the four individual tuning forks F1 to F4 to the substrate. The driving electrodes are arranged in pairs along an outer side of each resonant structure of each of the four individual tuning forks F1 to F4. The sensing electrodes are arranged in pairs above and below each resonant structure of each of the four individual tuning forks F1 to F4. In this regard, the sensing electrodes arranged below each resonant structure may be placed directly onto the substrate. The sensing electrodes arranged above each resonant structure may be optional. Here, the particular placement of the sensing electrodes with respect to the resonant structure may facilitate the manufacturing process and/or assist in noise cancellation. For example, placing the sensing electrodes above the resonant structures may facilitate a less complicated manufacturing process, while placing the sensing electrodes above and below the resonant structures may assist in cancellation of output signal noise.

According to an exemplary embodiment, the driving electrodes may be individually operated to drive a single tuning fork, two orthogonal tuning forks, and/or all four tuning forks.

Figures 5A, 5B:
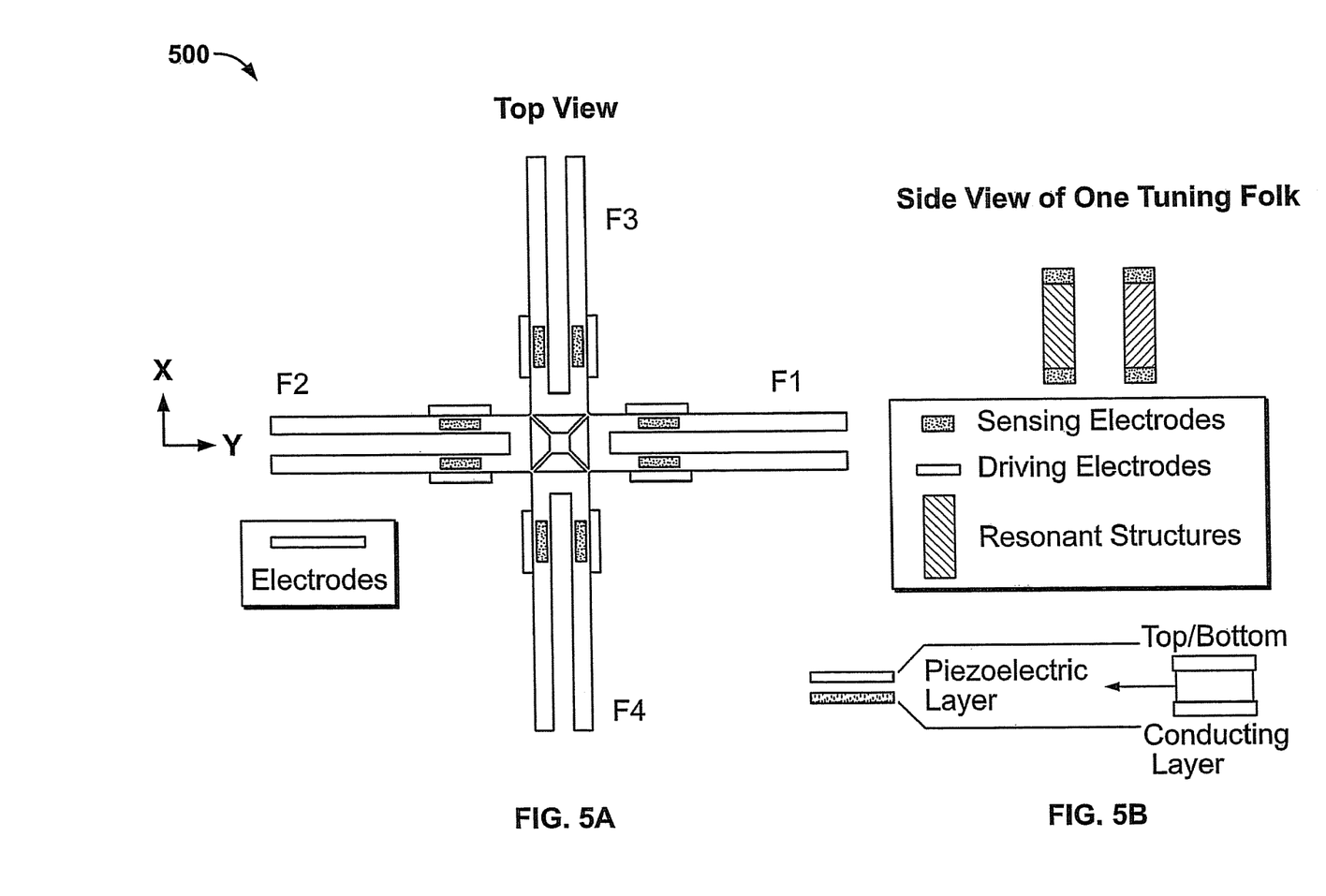
FIG. 5A is a top view of an exemplary yaw rate sensing unit, which operates according to a piezoelectric principle.
FIG. 5B is a side view of the exemplary yaw rate sensing unit of FIG. 5A.

FIGS. 5A and 5B are a top view and a side view, respectively, of an exemplary yaw rate sensing unit 500, which operates according to a piezoelectric principle. The exemplary yaw rate sensing unit 500 includes four individual tuning forks F1 to F4, driving electrodes, and sensing electrodes. The four individual tuning forks F1 to F4 are arranged along the +X, −X, +Y and −Y axial directions, respectively, and are mechanically coupled together in a center location via an anchor. The driving electrodes are arranged in pairs along an outer side of each resonant structure of each of the four individual tuning forks F1 to F4. The sensing electrodes are arranged in pairs above and below each resonant structure of each of the four individual tuning forks F1 to F4. The sensing electrodes arranged above each resonant structure may be optional.

According to an exemplary embodiment, the driving electrodes may be individually operated to drive a single tuning fork, two orthogonal tuning forks, and/or all four tuning forks. Sensing signals may come from all four individual tuning forks F1 to F4 or only two orthogonal tuning forks.

Figure 6A:
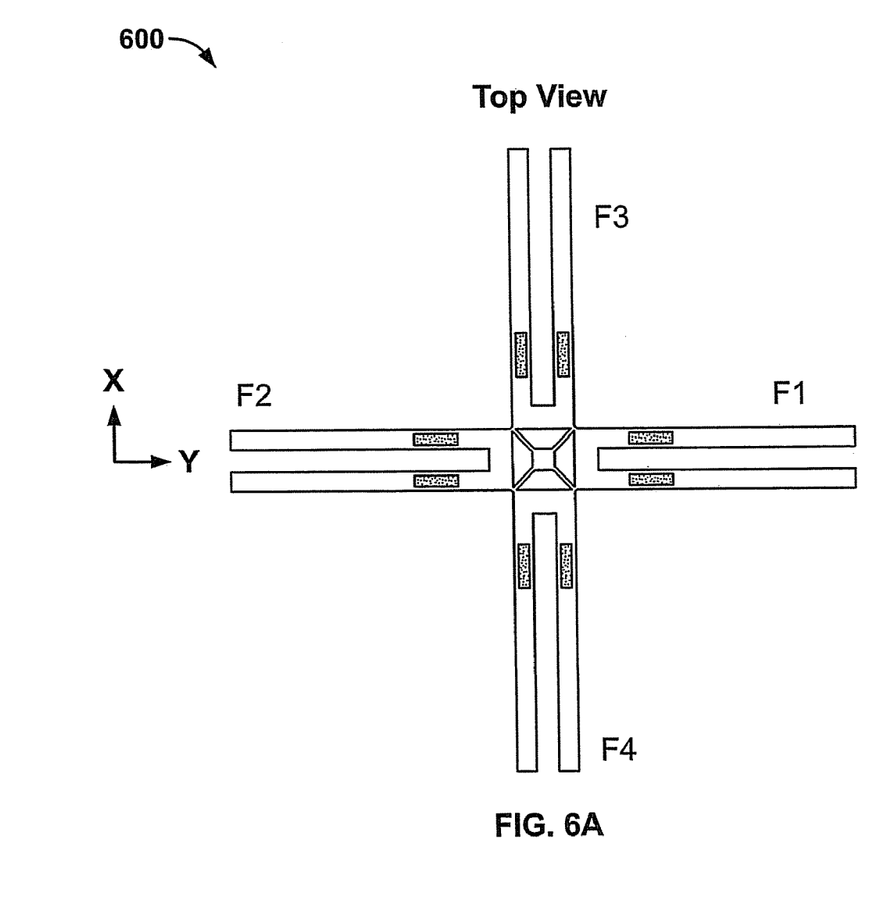
FIG. 6A is a top view of an exemplary yaw rate sensing unit, which operates according to a piezoresistive principle.
Figure 6B:
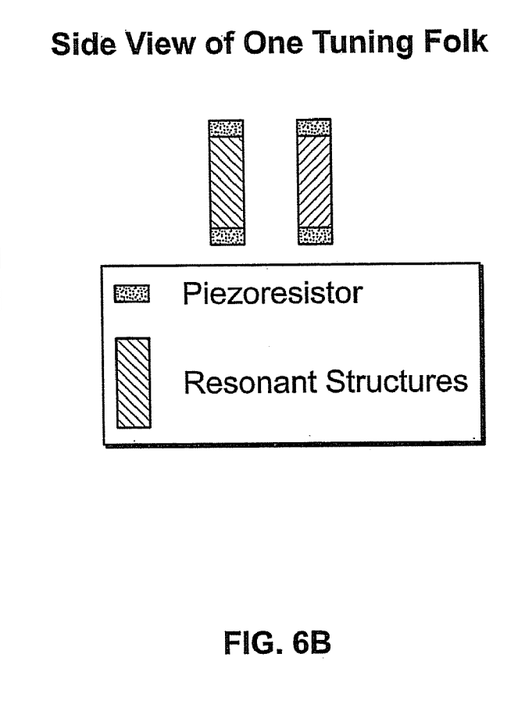
FIG. 6B is a side view of the exemplary yaw rate sensing unit of FIG. 6A.

FIGS. 6A and 6B are a top view and a side view, respectively, of an exemplary yaw rate sensing unit 600, which operates according to a piezoresistive principle. The exemplary yaw rate sensing unit 600 includes four individual tuning forks F1 to F4 and piezoresistors. The four individual tuning forks F1 to F4 are arranged along the +X, −X, +Y and −Y axial directions, respectively, and are mechanically coupled together in a center location via an anchor. The piezoresistors are arranged on top and/or bottom of each resonant structure of each of the four individual tuning forks F1 to F4.

According to an exemplary embodiment, the exemplary yaw rate sensing unit 600 is driven using an electrostatic force or a piezoelectric force. Sensing is accomplished via piezoresistivity.

Figure 7:
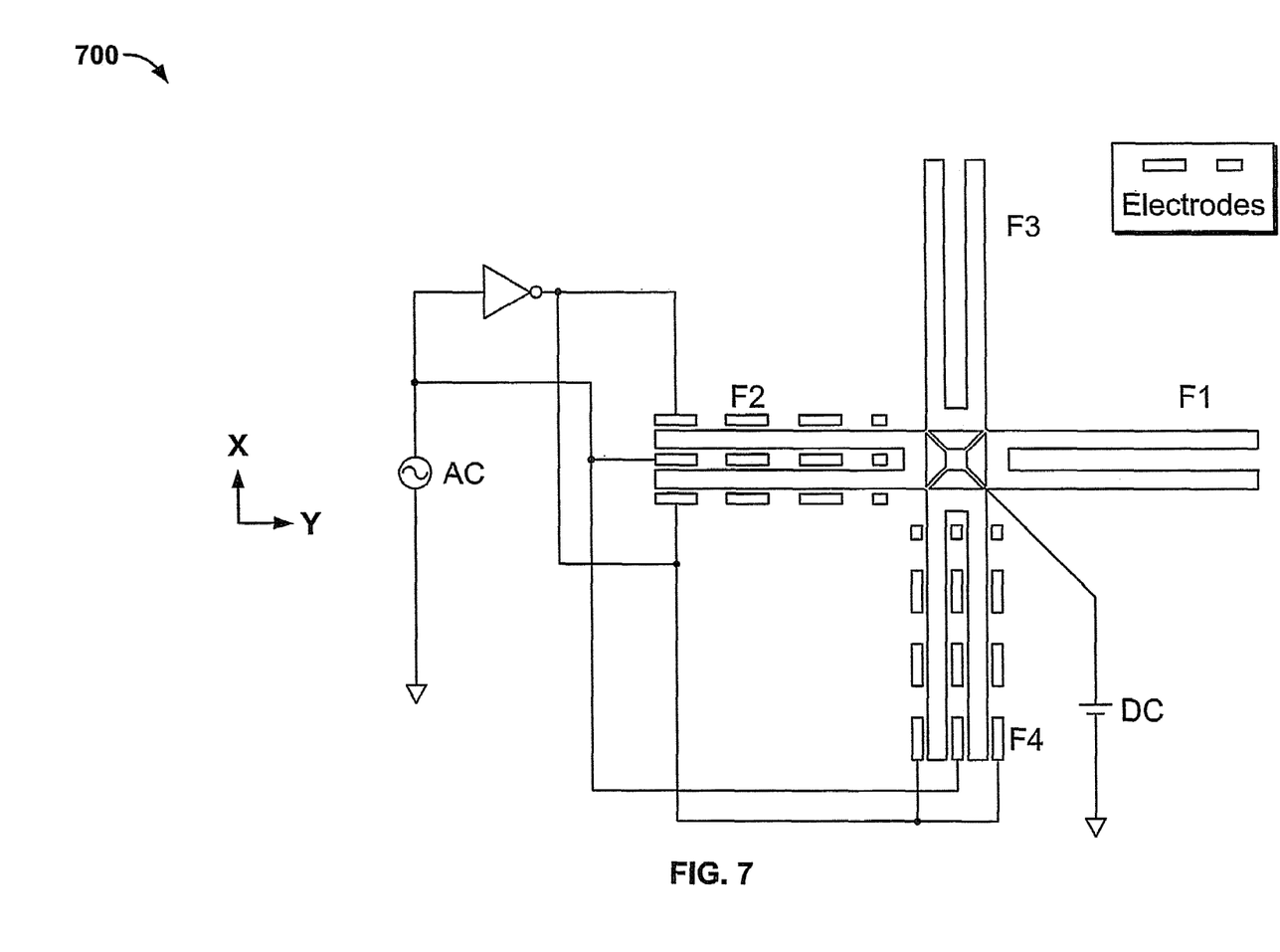
FIG. 7 shows an exemplary driving and sensing schematic for an exemplary yaw rate sensing unit, which operates according to a capacitive principle.

FIG. 7 shows an exemplary driving and sensing schematic for an exemplary yaw rate sensing unit, which operates according to a capacitive principle. Here only one driving circuitry is required.

FIG. 10 shows an exemplary dual-axis yaw rate system 1000 having only one drive electronics and only one control circuitry for demodulation, which reduces chip space requirements and power consumption. The exemplary dual-axis yaw rate systems 1000 includes MEMS arrangement or portion 1010 and an evaluation electronics 1020. The MEMS portion 1010 includes a first drive MEMS 1011a, a second drive MEMS 1011b, a first coriolis MEMS 1012a and a second coriolis MEMS 1012b. In this regard, the first drive MEMS 1011a and the second drive MEMS 1011b are mechanically coupled together so that if one is driven (i.e., vibrated), the other will also vibrate with the same resonance frequency. The evaluation electronics 1020 includes drive electronics 1021, a first coriolis detection electronics 1022a, a second coriolis detection electronics 1022b, and a demodulation control circuit 1023.

The drive electronics 1021 drives the MEMS portion 1010 (i.e., the first drive MEMS 1011a and the second drive MEMS 1011b) at its resonance frequency with a defined amplitude to make use of the Coriolis effect which is proportional to the velocity of the moving mass and results in a force that will be measured by the first and second coriolis detection electronics 1022a and 1022b. In this instance, the drive electronics 1021 is provided with automatic gain control (AGC). The dashed line connecting the first drive MEMS 1011a and the drive electronics 1021 indicates that the circuitry may be optionally operating in a closed loop.

The first and second coriolis detection electronics 1022a and 1022b measure the force that is generated because of the Coriolis effect. Since the first drive MEMS 1011a and the second drive MEMS 1011b are oscillating at the same drive resonance frequency, the coriolis signal is an AC signal at the drive resonance frequency. If the coriolis resonance frequency is the same as the drive resonance frequency and the quality factor Q of the coriolis MEMS is high, the coriolis signal should have a high signal-to-noise ratio. Each of the first coriolis detection electronics 1022a and 1022b includes a front end 1024a or 1024b, a demodulator 1025a or 1025b, and a LP 1026a or 1026b. The first and second coriolis detection electronics 1022a and 1022b may optionally be operated in a closed loop, as indicated by the dashed lines connecting the first coriolis detection electronics 1022a to the first coriolis MEMS 1012a, and the second coriolis detection electronics 1022b to the second coroilis MEMS 1012b.

The demodulation control circuit 1023 provides a control signal to demodulate the output of each the first and second coriolis front ends 1024a and 1024b with a signal at the drive resonant frequency and the proper phase information to filter out the coriolis signal in the coriolis loop. In this instance, a phase lock loop (PLL) may be used to generate the control signals for the demodulation.

FIG. 11 shows an exemplary dual-axis yaw rate system 1100, which uses only one front end followed by a multiplexer for the coriolis loop since the multiplexing between front ends is easily performed if both drive loops operate as the same frequency. The exemplary dual-axis yaw rate system 1100 includes MEMS portion 1110 and an evaluation electronics 1120. The MEMS portion 1110 includes a first drive MEMS 1111a, a second drive MEMS 1111b, a first coriolis MEMS 1112a and a second coriolis MEMS 112b. In this regard, the first drive MEMS 1111a and the second drive MEMS 1111b are mechanically coupled together so that if one is driven (i.e., vibrated), the other will also vibrate with the same resonance frequency. The evaluation electronics 1120 includes drive electronics 1121, coriolis detection electronics 1122, and a demodulation control circuit 1123.

The drive electronics 1121 drives the MEMS portion 1110 (i.e., the first drive MEMS 1111a and the second drive MEMS 1111b) at its resonance frequency with a defined amplitude to make use of the coriolis effect which is proportional to the velocity of the moving mass and results in a force that will be measured by the coriolis detection electronics 1122. In this instance, the drive electronics 1121 is provided with automatic gain control (AGC). The dashed line connecting the first drive MEMS 1111 and the drive electronics 1121 indicates that the circuitry may be optionally operating in a closed loop.

The coriolis detection electronics 1122 measures the force that is generated because of the coriolis effect. Since the first drive MEMS 1111a and the second drive MEMS 111b are oscillating at the same drive resonance frequency, the coriolis signal is an AC signal at the drive resonance frequency. If the coriolis resonance frequency is the same as the drive resonance frequency and the quality factor Q of the coriolis MEMS is high, the coriolis signal should have a high signal-to-noise ratio. The coriolis detection electronics 1122 includes a MUX 1127, a front end 1124, a DEMUX 1128, a first demodulator 1125a, a second demodulator 1125b, a first LP 1126a and a second LP 1126b. The coriolis detection electronics 1122 may optionally be operated in closed loop, as indicated by the dashed lines connecting the coriolis detection electronics 1122 to each of the first and second coriolis MEMS 1112a and 1112b.

The demodulation control circuit 1123 provides a control signal to demodulate the output of the coriolis front end 1124 with a signal at the drive resonant frequency and the proper phase information to filter out the coriolis signal in the coriolis loop. In this instance, a phase lock loop (PLL) may be used to generate the control signals for the demodulation.

What is claimed is:

1. A dual-axis yaw rate sensor, comprising:
four open-ended tuning forks arranged coplanarly in two opposite pairs, a first pair of open-ended tuning forks being arranged opposite one another along a first axis, a second pair of open-ended tuning forks being arranged opposite one another along a second axis, the first axis and the second axis being perpendicular to one another;

at least one pair of driving electrodes arranged to vibrate at least one of the tuning forks; and a common drive unit to drive the at least one pair of driving electrodes at a common frequency, wherein the four open-ended tuning forks are mechanically coupled together so that all four tuning forks vibrate in the same manner in terms of frequency and phase.

2. The dual-axis yaw rate sensor of claim 1, further comprising:

an anchor to anchor the tunings forks and to serve as a common point at which the tuning forks are mechanically coupled together.

3. The dual-axis yaw rate sensor of claim 1, wherein the at least one pair of driving electrodes operate to produce an electrical static force.

4. The dual-axis yaw rate sensor of claim 1, wherein the at least one pair of driving electrodes operate to produce a piezoelectric force.

5. The dual-axis yaw rate sensor of claim 1, further comprising:

at least one pair of sensing electrodes to sense a vibration of at least one of the tuning forks.

6. The dual-axis yaw rate sensor of claim 5, further comprising:

a common sensing unit to process detection signals from the at least one pair of sensing electrodes at the common frequency, the detection signals representing a yaw rate in two axial directions.

7. The dual-axis yaw rate sensor of claim 6, wherein the at least one pair of sensing electrodes operate as capacitive electrodes.

8. The dual-axis yaw rate sensor of claim 6, wherein the at least one pair of sensing electrodes operate as piezoelectric electrodes.

9. The dual-axis yaw rate sensor of claim 6, wherein the at least one pair of sensing electrodes operate as piezoresistive electrodes.

10. A yaw rate sensor, comprising:

a single resonant structure for sensing simultaneously a yaw rate in at least two axial directions, the single resonant structure including at least four open-ended tuning forks mechanically coupled together at a common point so that all of the tuning forks vibrate in the same manner in terms of frequency and phase; and a single drive unit to vibrate the tuning forks at a common frequency.

11. The yaw rate sensor of claim 10, further comprising:

a single sensing unit to sense a vibration of the tuning forks simultaneously in the at least two axial directions at the common frequency.

12. The yaw rate sensor of claim 10, further comprising:

a plurality of sensing units to sense a vibration of the tuning forks, each of the sensing units sensing the yaw rate in one of the at least two axial directions.

13. A yaw rate sensor, comprising:

a plurality of open-ended tuning forks mechanically coupled together so that all tuning forks vibrate in the same manner in terms of frequency and phase; and a single drive unit to vibrate the plurality of tuning forks at a common frequency.

14. The yaw rate sensor of claim 13, further comprising:

a single sensing unit to sense a vibration of the tuning forks simultaneously in more than one axial direction at the common frequency.

15. The yaw rate sensor of claim 13, wherein the plurality of open-ended tuning forks are arranged coplanarly in two opposite pairs, a first pair of open-ended tuning forks being arranged opposite one another along a first axis, a second pair of open-ended tuning forks being arranged opposite one another along a second axis, the first axis and the second axis being perpendicular to one another.

16. A dual-axis yaw rate sensor, comprising:

a MEMS arrangement including a first coriolis component, a second coriolis component, a first drive component to drive the first coriolis component, and a second drive component to drive the second coriolis component, the first drive component and the second drive component mechanically coupled together so that each will vibrate in the same manner in terms of frequency and phase; and a common driving arrangement to drive the first and second drive components.

17. The dual-axis yaw rate sensor of claim 16, further comprising:

a common evaluation arrangement coupled to the first and second coriolis components.

* * * * *

UNITED STATES PATENT AND TRADEMARK OFFICE
CERTIFICATE OF CORRECTION

| | | |
|---|---|---|
| PATENT NO. | : 7,401,517 B2 | Page 1 of 1 |
| APPLICATION NO. | : 11/506712 | |
| DATED | : July 22, 2008 | |
| INVENTOR(S) | : Zhiyu Pan et al. | |

It is certified that error appears in the above-identified patent and that said Letters Patent is hereby corrected as shown below:

Column 2, lines 45 through 50: Please delete Figure 10 and Figure 11;

--Figure 10...loop.--

Column 5, line 17, change "nultiplexer" to --multiplexer--

Signed and Sealed this

Twenty-third Day of June, 2009

JOHN DOLL
*Acting Director of the United States Patent and Trademark Office*